(12) United States Patent
Matsuura

(10) Patent No.: US 6,363,402 B1
(45) Date of Patent: Mar. 26, 2002

(54) SYSTEM AND METHOD INSURING APPLICATION AND OPERATING SYSTEM OPERATIONAL COMPATIBILITY

(75) Inventor: Yoko Matsuura, Tokyo (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/212,325

(22) Filed: Dec. 15, 1998

(30) Foreign Application Priority Data

Dec. 17, 1997 (JP) ............................................. 9-347600

(51) Int. Cl.⁷ .............................. G06F 17/00; G06F 9/00
(52) U.S. Cl. .......................................... 707/203; 717/11
(58) Field of Search ............................. 707/203; 717/11

(56) References Cited

U.S. PATENT DOCUMENTS

| | | | | |
|---|---|---|---|---|
| 5,379,342 A | * | 1/1995 | Arnold et al. ................... 380/2 |
| 5,410,651 A | * | 4/1995 | Sekizawa et al. ............ 709/224 |
| 5,430,878 A | * | 7/1995 | Straub et al. ................ 395/712 |
| 5,579,511 A | * | 11/1996 | Cavasa et al. ......... 395/500.48 |
| 5,809,287 A | * | 9/1998 | Stupek, Jr. et al. ............ 703/22 |
| 5,832,275 A | * | 11/1998 | Olds ............................ 717/11 |
| 5,892,683 A | * | 4/1999 | Sung ............................ 703/27 |
| 5,960,189 A | * | 9/1999 | Stupek, Jr. et al. ............ 703/22 |
| 6,145,126 A | * | 1/2000 | Matsukura et al. ............ 717/11 |
| 6,067,622 A | * | 5/2000 | Moore ........................ 713/200 |
| 6,131,088 A | * | 10/2000 | Hill .............................. 705/27 |
| 6,141,652 A | * | 10/2000 | Reeder ........................ 705/53 |
| 6,161,135 A | * | 12/2000 | Ehrlich et al. .............. 709/221 |
| 6,182,275 B1 | * | 1/2001 | Beelitz et al. ................. 717/1 |
| 6,185,484 B1 | * | 2/2001 | Rhinehart ...................... 701/1 |

* cited by examiner

*Primary Examiner*—Maria N. Von Buhr
(74) *Attorney, Agent, or Firm*—Lerner, David, Littenberg, Krumholz & Mentlik, LLP

(57) ABSTRACT

Installation of an application program which is not compatible with a version of an OS is prevented. On a transmission side, information bits of one code word are assumed to represent the entirety of both an application program to be distributed to a receiving side and system software, including an OS of a version with which the application program is compatible, and an ECC for the information bits is computed and is attached to the application program. On the receiving side, compatibility between the application program and the system software which has already been installed is determined on the basis of the ECC attached to the distributed application program, and the distributed application program is installed on the basis of the determination result.

13 Claims, 9 Drawing Sheets

BROADCASTING SYSTEM

SYSTEM AND METHOD INSURING APPLICATION AND OPERATING SYSTEM OPERATIONAL COMPATIBILITY

BACKGROUND OF THE INVENTION

1. Field of the Invention

The present invention relates to an information processing apparatus, an information processing method, and a distribution medium. More particularly, the present invention relates to an information processing apparatus, an information processing method, and a distribution medium, which are suitable for use when, for example, an application program which operates under a predetermined OS (operating system) is installed.

2. Description of the Related Art

In computers, generally, various application programs are executed under the control of a predetermined OS.

Generally, application programs are dependent on the OS, and there are cases in which application programs operate only with an OS of a predetermined version. Therefore, when a certain application program is installed, usually, an installer confirms whether or not the application program is compatible with the OS which has already been installed and installs the application program only when the compatibility has been confirmed, that is, only when the application program is of a version which can be operated with the OS which has already been installed in the computer.

However, in general, the installer determines the compatibility between an application program and the OS by, for example, referring to the version of the application program as designated in the application program. Therefore, if an erroneous description of the version is made by the provider of the application program, an application program which is not compatible with the OS will be installed, and the computer may not operate or may malfunction.

SUMMARY OF THE INVENTION

An object of the present invention, which has been achieved in view of the above circumstances, is to make it possible to prevent, for example, installation of an application program which is not compatible with the OS which is installed currently.

According to a first aspect of the present invention, there is provided an information processing apparatus, comprising: computation means for assuming an information code of one code word to represent the entirety of both first and second computer programs and computing a total check code which is a check code for the information code; and attaching means for attaching the total check code to the second computer program.

According to a second aspect of the present invention, there is provided an information processing method, comprising the steps of: assuming an information code of one code word to represent the entirety of both first and second computer programs and computing a total check code which is a check code for the information code; and attaching the total check code to the second computer program.

According to a third aspect of the present invention, there is provided a distribution medium, which is obtained by assuming an information code of one code word to represent the entirety of both first and second computer programs and computing a total check code which is a check code for the information code, and attaching the total check code to the second computer program.

According to a fourth aspect of the present invention, there is provided an information processing apparatus, comprising: determination means for determining compatibility between a second computer program and the computer program which has already been stored in the storage means on the basis of the check code attached to the second computer program when the second computer program dependent on a first computer program is distributed; and storage control means for causing the second computer program to be stored in the storage means on the basis of the determination result of the determination means.

According to a fifth aspect of the present invention, there is provided an information processing method comprising the steps of: when a second computer program dependent on a first computer program is distributed, determining compatibility between the second computer program and the computer program which has already been stored in storage means for storing a computer program on the basis of a check code attached to the second computer program; and causing the second computer program to be stored in the storage means on the basis of the determination result.

In the information processing apparatus in accordance with the first aspect of the present invention, the computation means assumes an information code of one code word to represent the entirety of both first and second computer programs which are dependent on each other and computes a total check code which is a check code for the information code, and attaching means attaches the total check code to the second computer program.

In the information processing method in accordance with the second aspect of the present invention, an information code of one code word is assumed to represent the entirety of both the first and second computer programs and a total check code which is a check code for the information code is computed, and the total check code is attached to the second computer program.

In the distribution medium in accordance with the third aspect of the present invention, a distribution medium is distributed, which is obtained by assuming an information code of one code word to represent the entirety of both the first and second computer programs and computing a total check code which is a check code for the information code, and by attaching the total check code to the second computer program.

In the information processing apparatus in accordance with the fourth aspect of the present invention, determination means determines compatibility between a second computer program and a computer program which has already been stored in the storage means in accordance with a check code attached to the second computer program when the second computer program dependent on a first computer program is distributed; and storage control means causes the second computer program to be stored in the storage means on the basis of the determination result of the determination means.

In the information processing method in accordance with the fifth aspect of the present invention, when a second computer program dependent on a first computer program is distributed, a determination is made as to compatibility between the second computer program and the computer program which has already been stored in the storage means for storing a computer program on the basis of a check code attached to the second computer program, and the second computer program is stored in the storage means on the basis of the determination result.

The above and further objects, aspects and novel features of the invention will become more apparent from the following detailed description when read in connection with the accompanying drawings.

DESCRIPTION OF THE PREFERRED EMBODIMENT

Figure 1:
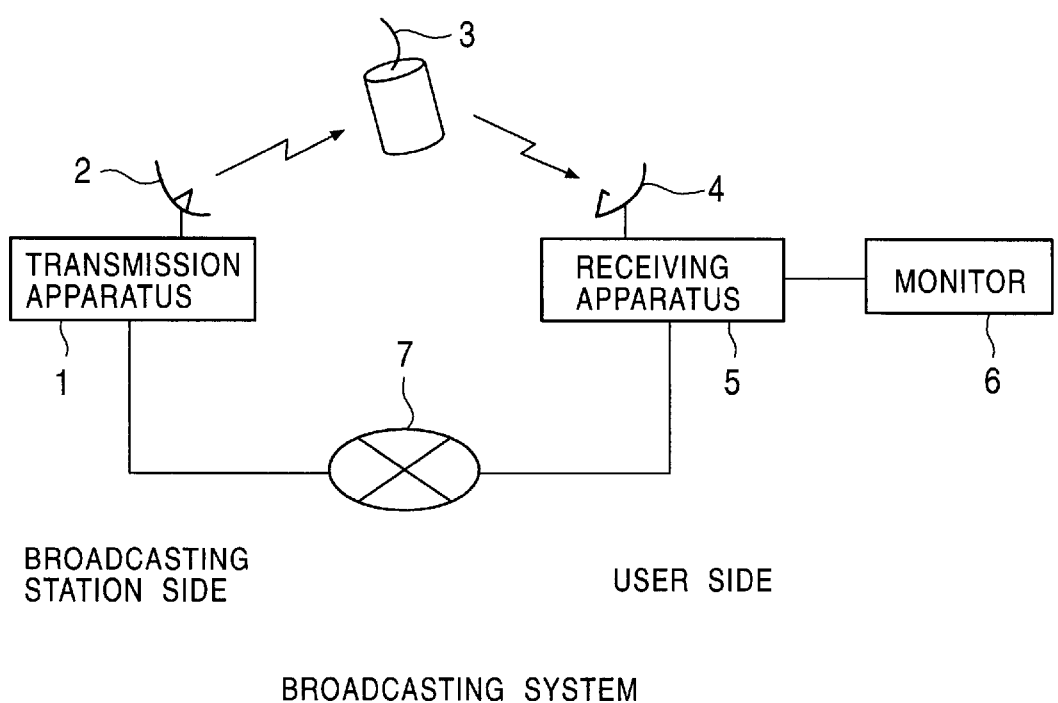
FIG. 1 shows an example of the construction of an embodiment of a broadcasting system of the present invention.

FIG. 1 shows an example of the construction of an embodiment of a broadcasting system (the "system" refers to one in which a plurality of apparatuses are logically assembled; it does not matter whether the apparatuses of each construction are in the same housing) of the present invention.

On a broadcast station side, in a transmission apparatus 1, digital video data and digital audio data as a program are encoded and scrambled, for example, using MPEG (Moving Picture Experts Group). Further, in the transmission apparatus 1, an MPEG transport stream (hereinafter referred to as a "TS" wherever appropriate) in which digital data and other required data as a program are placed is formed, and the MPEG transport stream is modulated, for example, using QPSK (Quadrature Phase Shift Keying).

Here, as data other than data of a program placed in the TS in the transmission apparatus 1, for example, there is a computer program executed by a receiving apparatus 5 on a user side. In the transmission apparatus 1, for one transponder, a TS in which, for example, data for six programs is multiplexed is formed. Here, it is assumed that, in order to transmit a computer program, for example, one PID (Packet Identification) is assigned.

In the transmission apparatus 1, a modulation signal in which the TS is modulated is up-converted and transmitted as radio waves from an antenna (parabola antenna) 2.

The radio waves from the antenna 2 are received by a satellite 3, are subjected to amplification and other necessary processing by the transponder (not shown), after which they are transmitted. The radio waves from the satellite 3 are received by an antenna (parabola antenna) 4 on the user (viewer) side and down-converted, after which they are supplied to the receiving apparatus 5 formed of an IRD (Integrated Receiver and Decoder) and the like.

In the receiving apparatus 5, initially, signals from the antenna 4 are selected. More specifically, the satellite 3 generally has a plurality of transponders, and the radio waves transmitted from the plurality of transponders are received by the antenna 4 and down-converted. Therefore, since the signals supplied from the antenna 4 contain signals from the plurality of transponders, the receiving apparatus 5 selects a signal corresponding to one of the transponders from the signals corresponding to the plurality of transponders in accordance with a channel selection operation performed by the user.

Furthermore, in the receiving apparatus 5, the selected signal, that is, the signal which is QPSK-modulated, is QPSK-demodulated, the resulting TS is descrambled, and the transport packet (hereinafter referred to as a "TS packet" wherever appropriate) of the channel selected by the user is extracted from the descrambled TS. Then, the data placed in the TS packet is MPEG-decoded, and the resulting image is supplied to a monitor 6 and displayed thereon and the sound is output from a speaker (not shown).

Furthermore, the receiving apparatus 5 extracts a TS packet in which a computer program is placed, as required, and installs (inputs) it. Then, in the receiving apparatus 5, the installed computer program is executed so that various processing is performed. That is, in the receiving apparatus 5, not only control of the respective blocks which constitute the receiving apparatus 5, but also the above described descrambling process, a process for acquiring a key used for the descrambling process, a process for accounting, and the like are performed.

Here, in the receiving apparatus 5, when descrambling is performed, a process for accounting for the viewing of the program, that is, for example, a process for preparing a viewing history, is performed as required. The accounting information obtained as a result of the processing is transmitted to the transmission apparatus 1 through, for example, a public network 7, and accounting is performed in accordance with this accounting information in the transmission apparatus 1.

Figure 2:
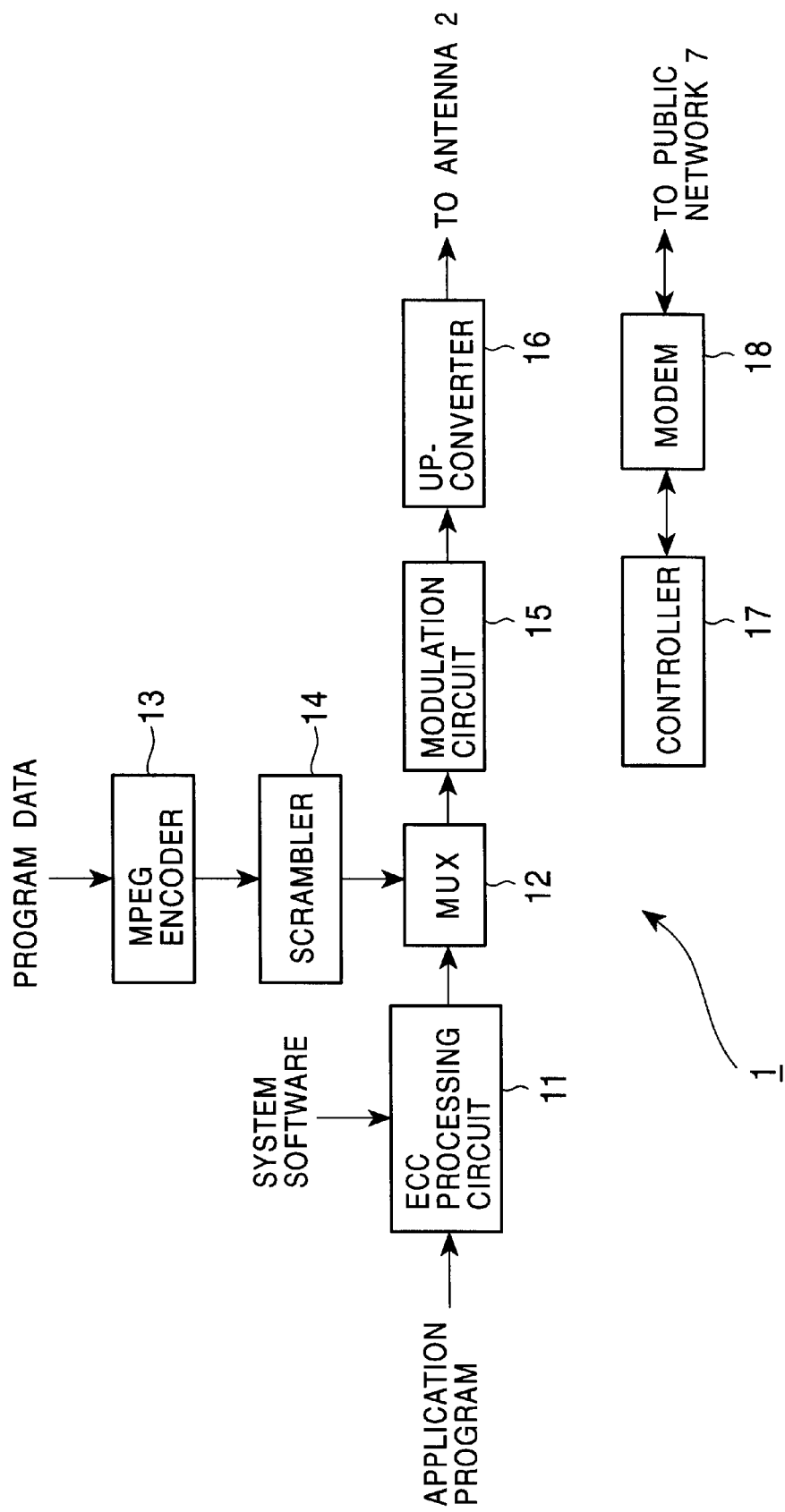
FIG. 2 is a block diagram showing an example of the construction of a transmission apparatus 1 of FIG. 1.

FIG. 2 shows an example of the construction of the transmission apparatus 1 of FIG. 1.

An application program to be distributed to a user, together with system software with which the application program is compatible, is input to an ECC processing circuit 11. That is, the application program is generally dependent on the system software and operates under the control of the system software of a predetermined version. Such application program and system software are input to the ECC processing circuit 11.

In this embodiment, the system software is made up of two computer programs called a boot part and a load part. The boot part performs the basic control of the computer and other apparatuses (here, the receiving apparatus 5) and includes a BIOS (Basic Input/Output System), an OS, and the like. The load part is used to install a computer program and is equivalent to what is commonly referred to as an installer. The load part may be contained in an application program. In such a case, the system software is made up of only the boot part. The unit at which an input is made as an application program to the ECC processing circuit 11 may be the whole computer program which performs one certain process (for example, a descrambling process), and when the computer program is made up of a plurality of modules, may be units of one or more modules.

Figure 3:
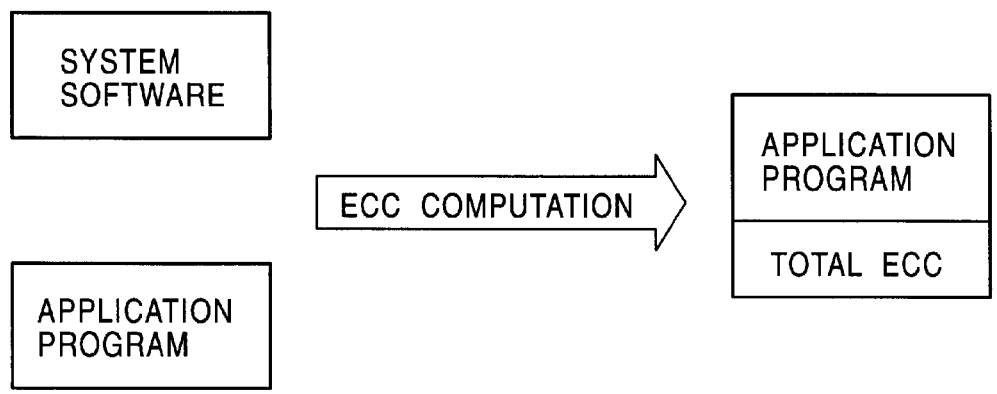
FIG. 3 is an illustration of the process of an ECC processing circuit 11 of FIG. 2.

As shown in FIG. 3, the ECC processing circuit 11 assumes information bits (information code) of one code word to represent the entirety of both the system software and the application program which are input to the ECC processing circuit 11, computes a total ECC (total check code) which is an ECC (check code) for the information bits in accordance with a predetermined algorithm, attaches the total ECC to the application program, and outputs it to a MUX (multiplexer) 12.

The MUX 12 multiplexes together the output of the ECC processing circuit 11 and the output of a scrambler 14 in order to form a TS, and supplies it to a modulation circuit 15. Program data taking the form of digital video data and digital audio data that accompanies the digital video data which form an ordinary program is supplied to an MPEG encoder 13. Then, the MPEG encoder 13 MPEG-encodes program data input thereto and outputs it to the scrambler 14. The scrambler 14 scrambles the output of the MPEG encoder 13 and supplies it to the MUX 12.

The modulation circuit 15, for example, QPSK-modulates the TS output by the MUX 12, and outputs the modulation signal obtained thereby to an up-converter 16. The up-converter 16 up-converts the modulation signal from the modulation circuit 15 and supplies it to the antenna 2.

A controller 17 controls each block which forms the transmission apparatus 1, as well as processes information supplied from a modem 18 in order to perform a process for accounting for the viewing of the program. The modem 18 receives accounting information and other information transmitted from the receiving apparatus 5 through the public network 7 and supplies it to the controller 17.

Next, a description will be given of the operation thereof.

The program data is input to the MPEG encoder 13 whereby it is MPEG-encoded and supplied to the scrambler 14. The scrambler 14 scrambles the output of the MPEG encoder 13 and supplies it to the MUX 12.

Meanwhile, an application program to be distributed to a user, together with corresponding system software (the system software of a version with which the application program is compatible), is input to the ECC processing circuit 11. In the ECC processing circuit 11, as shown in FIG. 3, information bits of one code word are assumed to represent the entirety of both the system software and the application program which are input the ECC processing circuit 11, an ECC (total ECC) for the information bits is computed, the total ECC is attached to the application program, and this is output to the MUX 12.

Here, the ECC processing circuit 11 is composed of a computer, such as a microcomputer; the total ECC is not computed manually, but is instead computed by the computer. Therefore, there is no possibility that the total ECC computed by the ECC processing circuit 11 will be erroneous except in a special case in which, for example, the computer which is a constituent of the ECC processing circuit 11 is defective.

The MUX 12 multiplexes together the output of the ECC processing circuit 11 and the output of the scrambler 14, forming a TS. This TS is supplied to the modulation circuit 15 whereby it is QPSK-modulated. The modulation signal obtained thereby is supplied to the antenna 2 through the up-converter 16 and transmitted as a radio wave.

When there is a request for establishing a communication link from the receiving apparatus 5 through the public network 7, the request is received by the modem 18, causing the communication link between the transmission apparatus 1 and the receiving apparatus 5 to be established. Then, required data is exchanged between the transmission apparatus 1 and the receiving apparatus 5. That is, when, for example, accounting information is transmitted from the receiving apparatus 5, it is received by the modem 18 and supplied to the controller 17. In this case, the controller 17 computes the fee for the viewing of the program in accordance with the accounting information.

Figure 4:
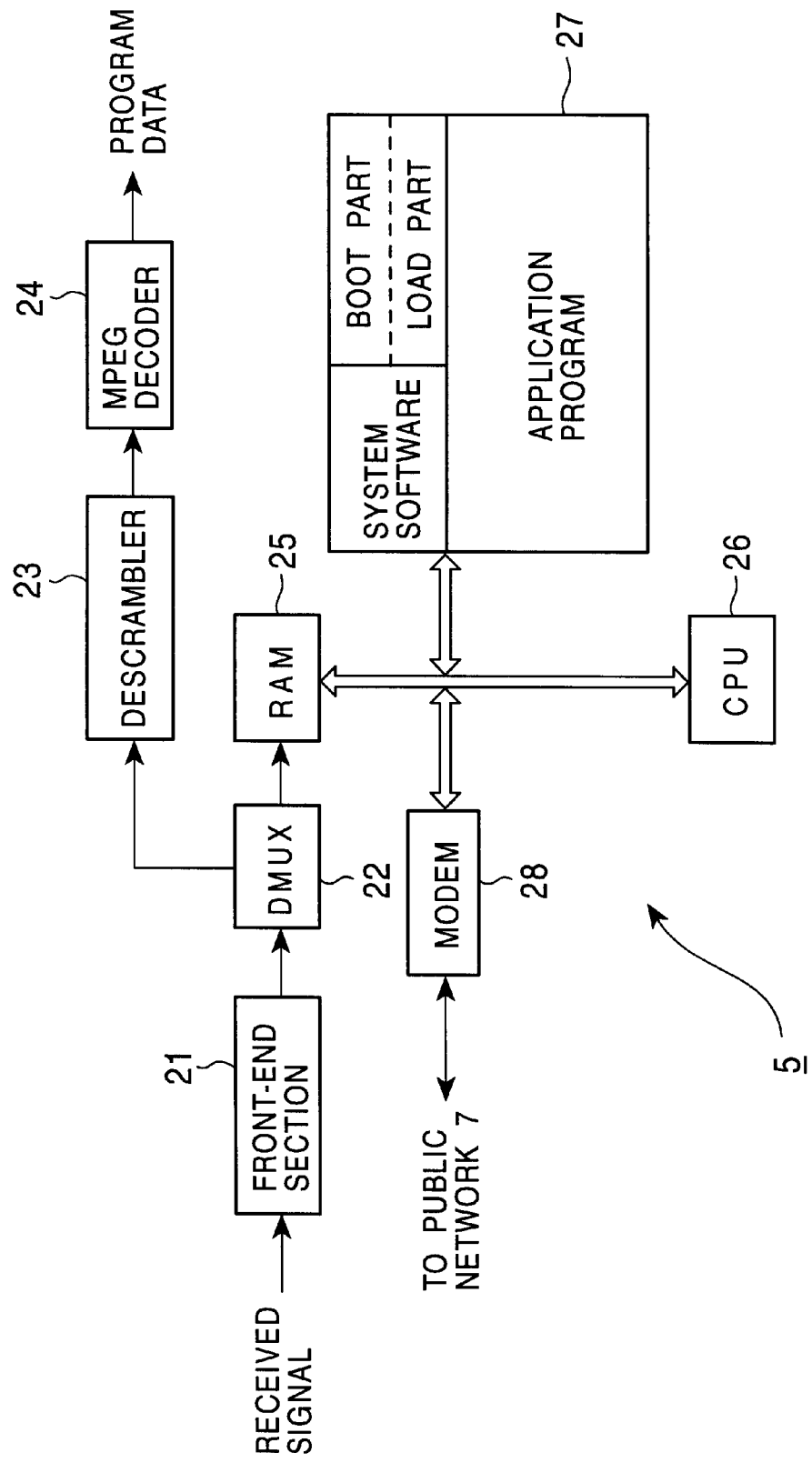
FIG. 4 is a block diagram showing an example of the construction of a receiving apparatus 5 of FIG. 1.

FIG. 4 shows an example of the construction of the receiving apparatus 5 of FIG. 1.

A signal which is received by the antenna 4 and down-converted is supplied to a front-end section 21. The front-end section 21 receives the signal from the antenna 4, performs a predetermined receiving process on the received signal, and supplies the TS obtained thereby to a DMUX (demultiplexer) 22. The DMUX 22 extracts a necessary TS packet by referring to a PID and the like in the TS packets which form the TS supplied thereto. Of the TS packets extracted by the DMUX 22, those related to an ordinary program are supplied to a descrambler 23 and those related to a computer program are supplied to a RAM (random access memory) 25.

The descrambler 23 descrambles the pay load of the program data placed in the TS packets from the DMUX 22 as required, and supplies it to an MPEG decoder 24. The MPEG decoder 24 decodes using MPEG the output of the descrambler 23 and outputs the decoded result.

The RAM 25 temporarily stores the computer program placed in the TS packets from the DMUX 22. A CPU 26 executes the computer program stored in a program memory 27 so as to control each block which forms the receiving apparatus 5, and other various processing. The program memory 27, formed of, for example, a flash memory or a HD (Hard Disk), stores a computer program to be executed by the CPU 26. A modem 28 performs control of communications with the transmission apparatus 1 (the modem 18) through the public network 7.

Here, it is assumed that system software of a predetermined version and an application program which can operate under the control of the system software have already been stored (installed) in the program memory 27.

In the receiving apparatus 5 constructed as described above, when an ordinary program is to be viewed, the front-end section 21 receives signals from the antenna 4 and selects received signals of a frequency band corresponding to the channel selected by the user by operating a remote controller (remote commander) (not shown). Further, the front-end section 21 performs QPSK demodulation and other necessary processing on the selected received signals and supplies the TS obtained thereby to the DMUX 22. The DMUX 22 extracts a TS packet having the PID corresponding to the channel selected by the user and supplies it to the descrambler 23. The descrambler 23 descrambles the output of the DMUX 22 and supplies it to the MPEG decoder 24. The MPEG decoder 24 decodes using MPEG the output of the descrambler 23, causing the image of the program being broadcasted in the channel selected by the user to be displayed and corresponding sound to be output.

Further, the DMUX 22 also extracts, from the TS supplied from the front-end section 21, a TS packet having a PID assigned to distribute a computer program. The computer program placed in this TS packet (here, an application program to which a total ECC is attached) is supplied to the RAM 25 and stored therein.

When the application program is stored in the RAM 25, the CPU 26 executes the load part of the system software stored in the program memory 27, thereby performing a process (hereinafter referred to as a "checking process" wherever appropriate) for determining compatibility between the application program stored in the RAM 25 and the system software which has already been stored in the program memory 27, and downloading and installing the application program stored in the RAM 25 on the basis of the determination result.

Figure 5:
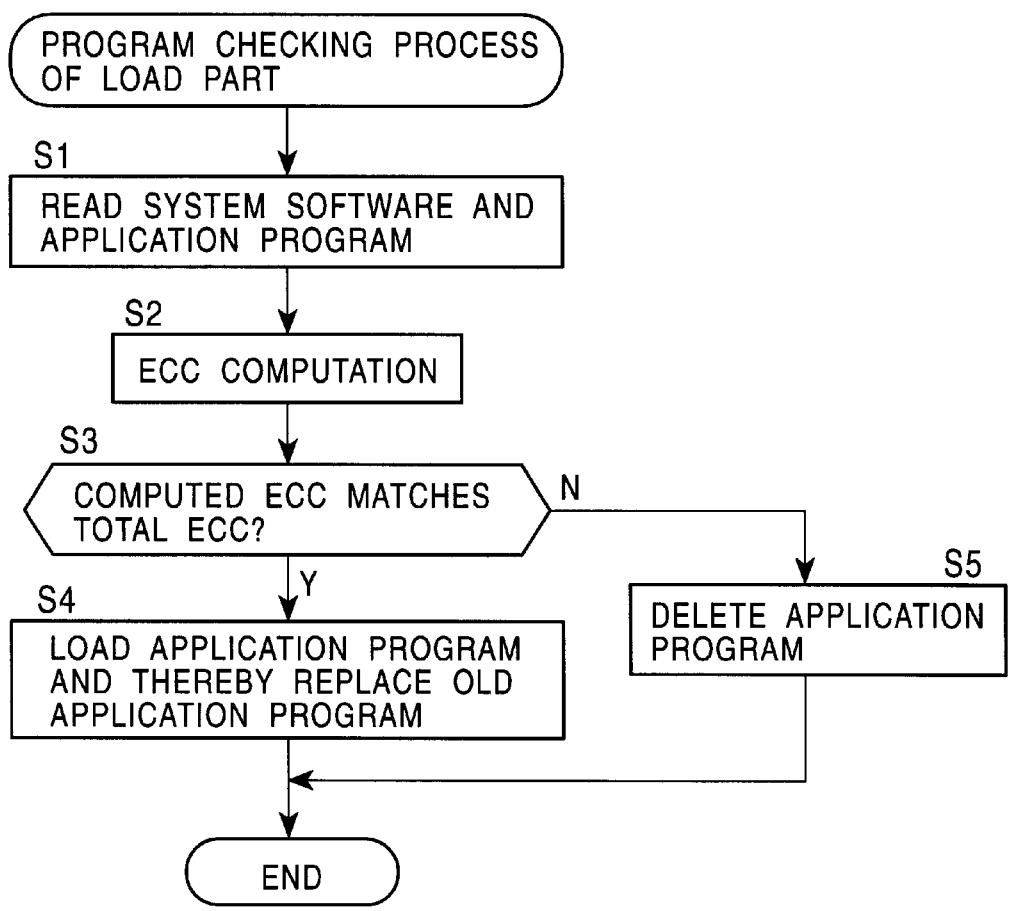
FIG. 5 is a flowchart illustrating the process of a CPU 26 of FIG. 4.

The flowchart of FIG. 5 shows the details of the checking process.

In the checking process, initially, in step S1, the system software stored in the program memory 27 and the application program stored in the RAM 25 are read, and the process proceeds to step S2 where information bits of one code word are assumed to represent the entirety of both the system software and the application program, and an ECC for the information bits is computed by the same algorithm as in the case of the ECC processing circuit 11, and the process proceeds to step S3.

In step S3, it is determined whether or not the ECC computed in step S2 (hereinafter referred to as the "computed ECC" wherever appropriate) matches the total ECC attached to the application program stored in the RAM 25.

When it is determined in step S3 that the computed ECC matches the total ECC, the application program stored in the RAM 25 is determined to be compatible and capable of operating under the system software stored in the program memory 27, and is installed. That is, in this case, the process proceeds to step S4 where the application program stored in the RAM 25 is downloaded and installed in the program memory 27, and the checking process is terminated. When an old version of the application program stored in the RAM 25 has been stored in the program memory 27, in step S4, a process for deleting the application program of that old version is also performed.

When, on the other hand, it is determined in step S3 that the computed ECC does not match the total ECC, the application program stored in the RAM 25 is determined to be not compatible and not capable of operating under the system software stored in the program memory 27, and is not installed. That is, in this case, the process proceeds to step S5 where the application program stored in the RAM 25 is deleted, and the checking process is terminated.

Therefore, when an application program is distributed which is not compatible with the system software currently installed, the computed ECC does not match the total ECC, making it possible to prevent such an application program from being installed. Conversely, only when an application program is distributed which is compatible with the system software installed currently, the computed ECC matches the total ECC; therefore, only such compatible application programs are installed, thereby making it possible to prevent the receiving apparatus 5 from halting operation or malfunctioning.

Furthermore, when an error occurs on a distribution medium (a satellite line in the embodiment of FIG. 1).in a step in which an application program is distributed, the computed ECC does not match the total ECC, making it possible to prevent installation of such an application program having an error. In this case, the reliability of the application program execution can be improved.

Although in the above-described case information bits of one code word are assumed to represent the entirety of both the application program and the system software with which the application program is compatible and an ECC (total ECC) for the information bits is computed, this technique can also be applied among a plurality of modules when the application program is formed of a plurality of modules.

More specifically, when an application program is formed of a plurality of modules and one or more of these modules are replaced with a new module (a module of a new version), the confirmation of compatibility between the new module and the other modules is performed conventionally in such a way that predetermined information (for example, a section) is described in the module and this information is referred to. However, also in this case, if erroneous information is described in the module and thereby a new module is installed, the application program may not operate normally. In contrast, if information bits of one code word are assumed to represent the entirety of both a new module and other modules, an ECC (total ECC) for the information bits is computed, this is attached to the new module and distributed, and a checking process such as that described with reference to FIG. 5 is performed, then it is possible to confirm the continuity of the modules without error and to prevent replacement with a module which is not compatible.

Meanwhile, when an application program and other computer programs are transmitted and installed in the receiving apparatus 5, improper acts, such as the computer program being intercepted, and decoded and falsified so as to, for example, evade payment of the fee for the viewing of the program, might be performed.

Therefore, generally, processing is performed such that a computer program is encrypted to prevent falsification thereof. In this case, on the transmission side, a process for encrypting a computer program is required, and on the receiving side, a process for decrypting the encryption is required, resulting in an increased load for only preventing falsification in both the transmitting and receiving sides.

Figure 6:
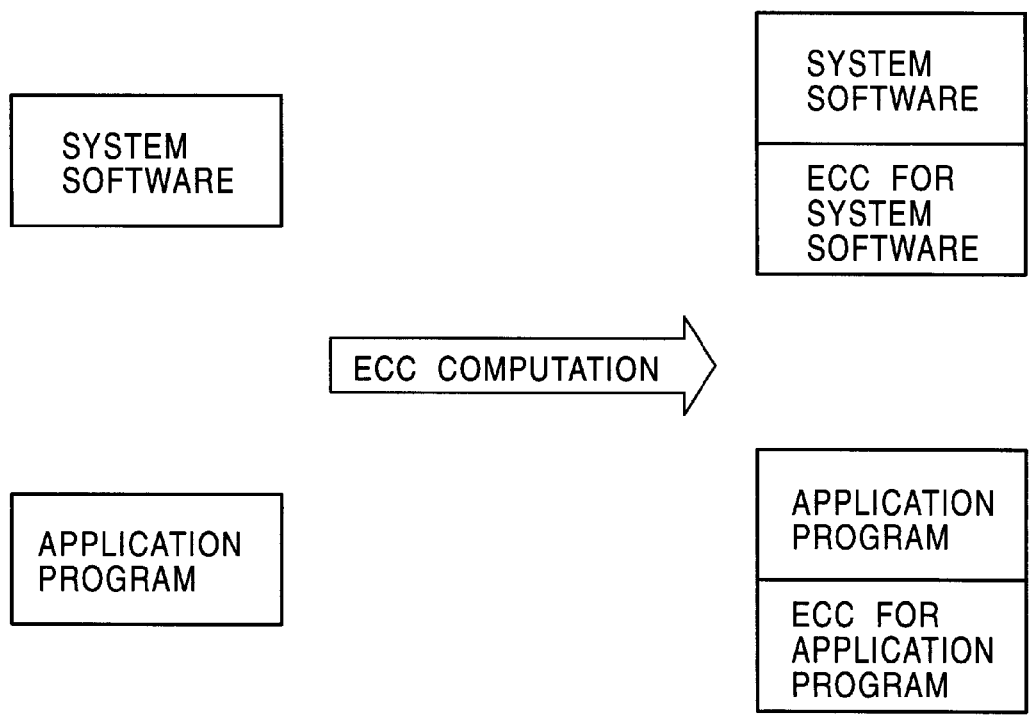
FIG. 6 is an illustration of the process of the ECC processing circuit 11 of FIG. 2.

Therefore, in the transmission apparatus 1 of FIG. 2, in the ECC processing circuit 11, as shown in FIG. 6, information bits of one code word are assumed to represent the entirety of the application program input thereto, an ECC for the information bits (hereinafter referred to as an "ECC for the application program" wherever appropriate) is computed in accordance with a predetermined algorithm, and the ECC for the application program is attached to the application program and transmitted.

In the embodiment of FIG. 6, in the ECC processing circuit 11, also, information bits of one code word are assumed to represent the entirety of the system software input thereto, an ECC for the information bits (hereinafter referred to as an "ECC for the system software" wherever appropriate) is computed in accordance with a predetermined algorithm, and the ECC for the system software is attached to the system program and transmitted. That is, in the embodiment of FIG. 6, both the application program and the system software with which the application program is compatible are transmitted.

Figure 7:
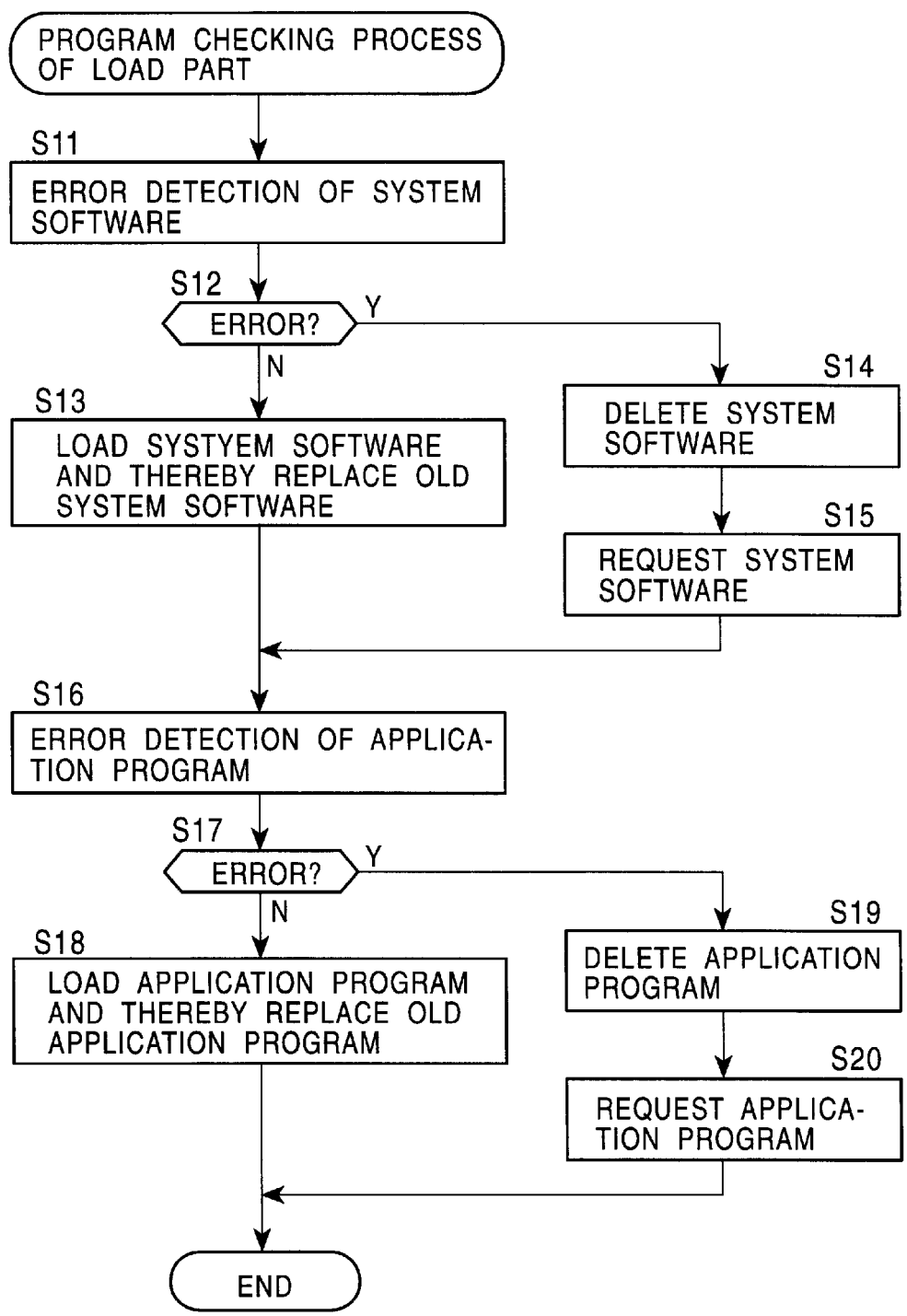
FIG. 7 is a flowchart illustrating the process of the CPU 26 of FIG. 4.

In this case, in the receiving apparatus 5 of FIG. 4, in the same manner as in the above-described case, the system software to which the ECC for the system software is attached, and the application program to which the ECC for the application program is attached are stored in the RAM 25, after which the load part of the system software stored in the program memory 27 is executed, thereby performing processing in accordance with, for example, the flowchart of FIG. 7.

More specifically, in this case, initially, in step S11, error detection is performed on the basis of the ECC for the system software attached to the system software stored in the RAM 25, and the process then proceeds to step S12 where it is determined whether or not an error has been detected. When it is determined in step S12 that an error has not been detected, the system software stored in the RAM 25 is recognized to be valid, that is, it is recognized to be authorized software which has not had its program falsified, and the process proceeds to step S13 where the system software stored in the RAM 25 is loaded and written into the program memory 27 (rewritten with a program which has already been recorded in the program memory 27). In step S13, only the boot part of the system software is written, and the load part is written after the processing shown in the flowchart of FIG. 7 is terminated (since the processing shown in the flowchart of FIG. 7 is performed as a result of the execution of the load part in the CPU 26, if the load part is rewritten during the execution thereof, normal processing might not be performed).

When, on the other hand, it is determined in step S12 that an error has been detected, it is recognized that the system software stored in the RAM 25 has been falsified (is invalid), the process proceeds to step S14 where the system software is deleted, and the process proceeds to step S15. In step S15, a request for the system software is made with respect to the transmission apparatus 1 via the modem 28 and the public network 7. When, in response to this request, the system software is retransmitted from the transmission apparatus 1 and stored in the RAM 25 of the receiving apparatus 5, processing of steps S11 to S15 of FIG. 7 is performed. Also, in this case, the transmission of the system software from the transmission apparatus 1 may be performed via the satellite 3 or via the public network 7.

After the processing of step S13 or S15, the process proceeds to step S16 where error detection is performed on the basis of the ECC for the application program attached to the application program stored in the RAM 25, and the process proceeds to step S17 where a determination is made as to whether or not an error has been detected. When it is determined in step S17 that an error has not been detected, the application program stored in the RAM 25 is recognized to be valid, and the process proceeds to step S18 where the application program stored in the RAM 25 is loaded and written into the program memory 27 (rewritten with a program which has already been recorded in the program memory 27).

When, on the other hand, it is determined in step S17 that an error has been detected, it is recognized that the application program stored in the RAM 25 has been falsified, the process proceeds to step S19 where the application program stored in the RAM 25 is deleted, and the process proceeds to step S20. In step S20, in the same manner as in step S15, a request for an application program is made to the transmission apparatus 1, and the processing is terminated. When, in response to this request, the application program is retransmitted from the transmission apparatus 1 and stored in the RAM 25 of the receiving apparatus 5, processing of steps S16 to S20 of FIG. 7 is performed. The transmission of the application program in this case may also be performed either via the satellite 3 or via the public network 7.

As described above, an ECC computed by assuming information bits of one code word to represent the entirety of the computer program (file), the ECC being for the information bits, is attached to the computer program and transmitted, and error detection is performed on the basis of the ECC, and only when there is no error, the computer program is installed. Therefore, it is possible to prevent installation of a computer program which has been falsified.

Furthermore, even when an error occurs on the distribution medium in a step in which a computer program is distributed, such an application program having an error is not installed, making it possible to improve the reliability of the computer program execution.

More specifically, in this case, attaching of an ECC and error detection using the ECC must be performed, and therefore, a load on the transmission side and the receiving side increases. However, according to these processes, it is possible to prevent installation of a falsified computer program and further, to improve the reliability of the computer program execution. Therefore, in comparison with a case in which a computer program is encrypted to prevent only falsification and the encryption is decrypted, efficiency of processing can be improved.

When data is transmitted, generally, an ECC is attached in units of transmission blocks. In this embodiment, an ECC is attached with respect to the entirety of the computer program, that is, specifically, an ECC is attached, for example, in units of one file. This is due to the following reasons that one file of the computer program generally has an amount of data larger than the transmission block units, and therefore, the file is divided into a plurality of transmission blocks and transmitted.

Since one file which is divided into a plurality of transmission blocks and transmitted in this way forms a normal computer program when all of the plurality of blocks are complete, the information will be meaningless unless all of the first to the last of the plurality of transmission blocks are normal. Therefore, when no error occurs up to the second from the last of the transmission blocks and an error occurs in the last transmission block, the error detection process is repeatedly performed the same number of times as the number of the plurality of transmission blocks, and a normal computer program is not set up in the end.

In contrast, when an ECC is attached in units of one file, the process of error detection of whether or not an error has occurred needs to be performed only once for the one file, and in comparison with a case in which an ECC is attached in units of transmission blocks and error detection is performed, a redundant process need not be performed.

In the embodiment of FIG. 7, when it is recognized that the computer program is not valid, a request is made to the transmission apparatus 1 so as to transmit a valid program. In addition to this, it is also possible to cause the transmission apparatus 1 to retransmit the computer program several times, and the receiving apparatus 5 to wait for the retransmission and to perform processing.

Next, the embodiment of FIG. 7 is constructed such that either the system software or the application program can be installed. As shown in the embodiment of FIG. 6, when both the system software and the application program are transmitted, it is common that both of them are compatible with each other. Therefore, in this case, the system software and the application program are preferably installed at the same time.

Figure 8:
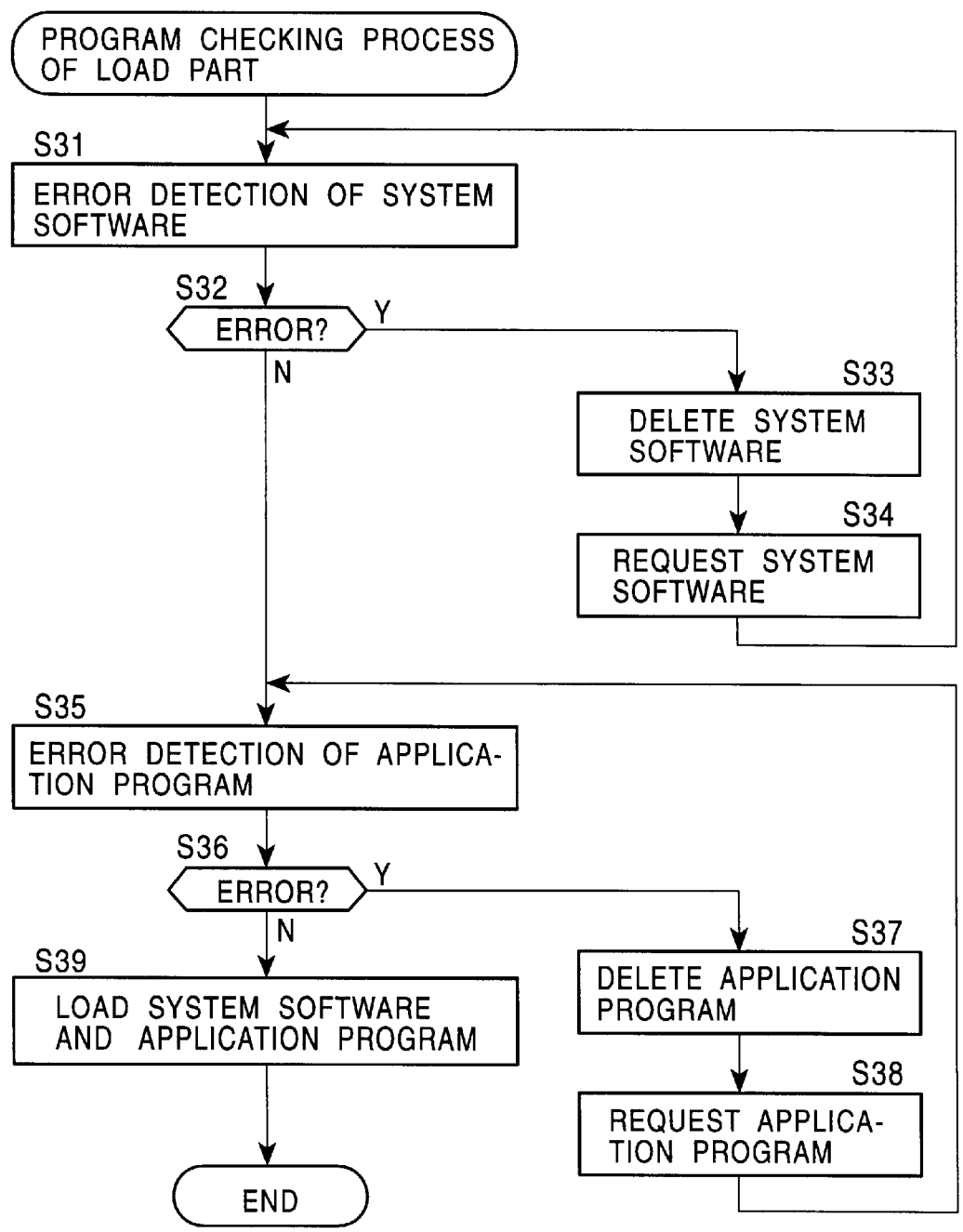
FIG. 8 is a flowchart illustrating the process of the CPU 26 of FIG. 4.

Therefore, by causing the CPU 26 to execute the load part of the system software stored in the program memory 27, a process in accordance with, for example, the flowchart shown in FIG. 8 can be performed instead of that in FIG. 7.

More specifically, in this case, in steps S31 to S34, processing which is the same as the cases of step S11, S12, S14, and S15 of FIG. 7, respectively, is performed. After the processing of step S34, the receiving apparatus waits for the retransmission of the system software from the transmission apparatus 1, and the process returns to step S31. That is, when an error is detected from the system software stored in the RAM 25, the processing of step S35 and those that follow is not performed.

When, on the other hand, it is determined in step S32 that an error has not been detected from the system software stored in the RAM 25, the loading of the system software is not yet performed, and the process proceeds to step S35 and those that follow, and in steps S35 to S38, processing which is the same as the cases of step S16, S17, S19, and S20 of FIG. 7, respectively, is performed. After the processing of step S38, the receiving apparatus waits for the retransmission of the system software from the transmission apparatus 1, and the process returns to step S35.

Then, when it is determined in step S36 that an error has not been detected from the application program stored in the RAM 25, that is, when an error has not been detected from the system software or the application program, the process proceeds to step S39 where the system software stored in the RAM 25 and the application program are installed in the program memory 27.

In this embodiment, as described above, the system software is composed of the boot part and the load part. For the system software, an ECC may be computed and attached separately for the boot part and the load part instead of attaching an ECC to the entirety of the system software. In this case, in the embodiment of FIG. 7, the processing of steps S11 to S15 is performed for each of the boot part and the load part, and in the embodiment of FIG. 8, the processing of steps S31 to S34 is performed for each of the boot part and the load part.

Although in the embodiment of FIG. 6 both the system software and the application program are transmitted, any one of them may be transmitted alone.

More specifically, in a case where, for example, the system software installed in the receiving apparatus 5 is of an old version and a new application program transmitted from the transmission apparatus 1 is not compatible with the system software of the old version, but is compatible with the system software of a new version, according to the processing described in FIG. 5, the new application program is installed only when the system software installed in the receiving apparatus 5 is replaced with that of the new version.

In such a case, if only an ECC for the system software, which is computed by assuming information bits to represent the entirety of only the system software of a new version, is attached thereto and transmitted, it is possible to install a valid system software which is not falsified.

Figure 9:
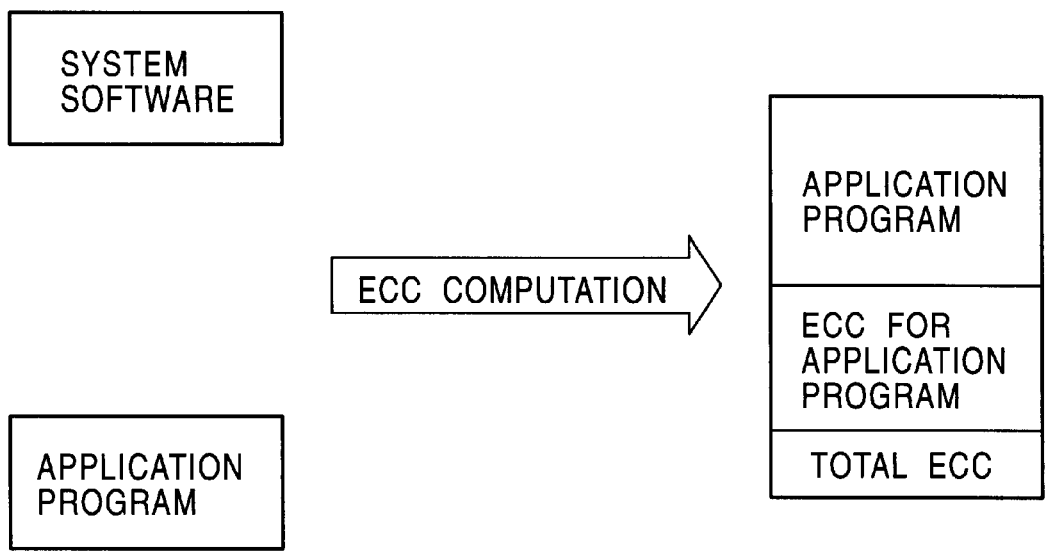
FIG. 9 is an illustration of the process of the ECC processing circuit 11 of FIG. 2.

When transmitting an application program, in the ECC processing circuit 11, as shown in FIG. 9, both the ECC for the application program and the total ECC may be computed and attached to the application program. In this case, in the receiving apparatus 5, compatibility with the system software stored in the program memory 27 is confirmed on the basis of the total ECC, and the validity (whether or not information has been falsified) can be confirmed on the basis of the ECC for the application program.

Although in this embodiment an ECC (total ECC) for the entirety of both the system software and the application program which are compatible with each other is computed and the total ECC is attached to the application program, in the present invention, in addition to the combination of the system software and the application program, for example, the combination of modules which form one computer program such as that described above, and the combination of computer programs which are dependent on each other in various ways, are possible.

In addition, the present invention is not limited to a receiving apparatus for receiving a digital satellite broadcast such as that shown in FIG. 1, but can be applied to any apparatus which loads and executes a computer program.

Furthermore, a computer program to be executed by the receiving apparatus 5 may be transmitted and distributed through a satellite line, the Internet, and other networks, and further, may be recorded on a floppy disk, a CD-ROM disk, and other recording media and distributed.

According to the information processing apparatus and the information processing method of the present invention, an information code of one code word is assumed to represent the entirety of both first and second computer programs which are dependent on each other, a total check code which is a check code for the information code is computed, and the total check code is attached to the second computer program. Further, according to the distribution medium of the present invention, a distribution medium is distributed, which is obtained by assuming an information code of one code word to represent the entirety of both first and second computer programs which are dependent on each other, computing a total check code which is a check code for the information code, and by attaching the total check code to the second computer program. Therefore, it is possible to determine whether or not the second computer program can be executed under the first computer program which has already been installed.

According to the information processing apparatus and the information processing method of the present invention, when a second computer program which is dependent on a first computer program is distributed, compatibility between the second computer program and a computer program which has already been stored in a storage means is determined on the basis of a check code attached to the second computer program, and the second computer program is stored in the storage means on the basis of the determination result. Therefore, it is possible to prevent installation of the second computer program which is not compatible with the computer program which has already been stored in the storage means.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An information processing apparatus for distributing a second computer program which is dependent on a first computer program, said information processing apparatus comprising:

computation means for assuming a total information code of one code word to represent the entirety of both the first and second computer programs and for computing a total check code for the total information code; and attaching means for attaching said total check code to the second computer program.

2. An information processing apparatus according to claim 1, wherein said computation means assumes a second information code of one code word to represent the entirety of the second computer program and computes a second check code for the second information code, and said attaching means attaches said second check code to the second computer program.

3. An information processing apparatus according to claim 1, wherein, when the first computer program is distributed together with the second computer program, said computation means assumes another information code of one code word to represent the entirety of the first computer program, and computes another check code for the another information code, and said attaching means attaches said another check code to the first computer program.

4. An information processing method for distributing a second computer program which is dependent on a first computer program, said information processing method comprising:

assuming an information code of one code word to represent the entirety of both the first and second computer programs;

computing a total check code for the information code; and attaching said total check code to the second computer program.

5. A distribution medium having a computer-readable program for distributing a second computer program which is dependent on a first computer program, the computer-readable program comprising:

assuming a total information code of one code word to represent the entirety of both the first and second computer programs;

computing a total check code which is a check code for the total information code; and attaching said total check code to the second computer program.

6. A distribution medium according to claim 5, wherein said computer-readable program further comprises:

assuming a second information code of one code word to represent the entirety of the second computer program;

computing a second check code for the second information code; and attaching said second check code to the second computer program.

7. A distribution medium according to claim 5, wherein, when the first computer program is distributed together with the second computer program, said computer-readable program further comprises:
assuming another information code of one code word to represent the entirety of the first computer program;
computing another check code for the another information code; and
attaching said another check code to the first computer program.

8. An information processing apparatus for performing a process for loading a second computer program which is dependent on another computer program, said information processing apparatus comprising:

storage means for storing computer programs;

determination means for determining operational compatibility between the second computer program and a first computer program which has already been stored in said storage means, said operational compatibility determined on the basis of a check code attached to the second computer program when the second computer program is distributed; and storage control means for causing the second computer program to be stored in said storage means on the basis of said operational compatibility determination.

9. An information processing apparatus according to claim 8, wherein said check code is a total check code computed by assuming an information code of one code word to represent the entirety of both the first and the second computer programs, said total check code being attached to the second computer program.

10. An information processing apparatus according to claim 9, further comprising:

computation means for assuming the information code and for computing a computed check code; and wherein said determination means determines said operational compatibility between the second computer program and the first computer program which has already been stored in said storage means depending on whether the computed check code matches said total check code attached to the second computer program.

11. An information processing apparatus according to claim 9, wherein a second check code for the second computer program is computed by assuming an information code of one code word to represent the entirety of the second computer program, the second check code being attached to the second computer program; and said determination means determines validity of the second computer program on the basis of the second check code for the second computer program.

12. An information processing apparatus according to claim 8, wherein another check code is computed by assuming an information code of one code word to represent the entirety of the first computer program, the another check code being attached to the first computer program;

said determination means determines validity of the first computer program on the basis of the another check code attached to the first computer program when the first computer program is distributed; and said storage control means stores the first computer program in said storage means depending on a second determination result of said determination means.

13. An information processing method for loading a second computer program which is dependent on another computer program, said information processing method comprising:

distributing the second program;

determining operational compatibility between the second computer program and a first computer program which has already been stored in a storage means for storing computer programs on the basis of a check code attached to the second computer program; and storing the second computer program on the basis of said operational compatibility determination.

* * * * *